US012275348B2

(12) United States Patent
Sagna (10) Patent No.: US 12,275,348 B2
(45) Date of Patent: Apr. 15, 2025

(54) LIGHTING DEVICE FOR A VEHICLE STEERING WHEEL AND VEHICLE STEERING WHEEL (71) Applicant: Autoliv Development AB, Vargarda (SE)

(72) Inventor: Boubacar Sagna, Paris (FR)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 18/261,422

(22) PCT Filed: Jan. 19, 2022

(86) PCT No.: PCT/EP2022/051093
§ 371 (c)(1),
(2) Date: Jul. 13, 2023

(87) PCT Pub. No.: WO2022/157177
PCT Pub. Date: Jul. 28, 2022

(65) Prior Publication Data
US 2024/0067082 A1    Feb. 29, 2024

(30) Foreign Application Priority Data
Jan. 20, 2021  (FR) ........................................ 2100537

(51) Int. Cl.
*B60Q 3/283*    (2017.01)
*B60K 35/00*    (2006.01)
*B60Q 3/62*     (2017.01)
*B62D 1/06*     (2006.01)
*B60K 35/60*    (2024.01)

(52) U.S. Cl.
CPC .............. *B60Q 3/283* (2017.02); *B60K 35/00* (2013.01); *B60Q 3/62* (2017.02); *B62D 1/06* (2013.01); *B60K 35/60* (2024.01); *B60K 2360/336* (2024.01); *B60K 2360/782* (2024.01)

(58) Field of Classification Search
CPC .................................. B60Q 3/283; B60Q 3/66
See application file for complete search history.

(56) References Cited

U.S. PATENT DOCUMENTS

| 6,616,313 | B2 | 9/2003 | Furst et al. |
| 2002/0041498 | A1 | 4/2002 | Fuerst et al. |
| 2014/0328077 | A1* | 11/2014 | Tovar ..................... B62D 1/046 362/511 |

(Continued)

FOREIGN PATENT DOCUMENTS

| DE | 102018200591 A1 | 7/2019 |
| FR | 3028476 A1 | 5/2016 |

(Continued)

*Primary Examiner* — Sean P Gramling
(74) *Attorney, Agent, or Firm* — Matthew D. Thayne; Thayne and Davis LLC (57) ABSTRACT

A lighting device (100) for a vehicle steering wheel rim (10), comprising:
at least two light sources (120),
a light diffuser (130) comprising a collecting face (131) and a diffusion face (132) arranged so as to transmit light emitted by the light sources (120) to an occupant of the vehicle when the lighting device (100) is integrated in the rim (10), characterized in that the collecting face (131) comprises at least two protrusions (133) positioned with respect to the light sources (120) such that the light transmitted by the diffusion face (132) is uniform.

16 Claims, 5 Drawing Sheets

(56) References Cited

U.S. PATENT DOCUMENTS

2022/0026044 A1* 1/2022 Käbisch ............ G02B 19/0014

FOREIGN PATENT DOCUMENTS

| FR | 3086732 A1 | 4/2020 |
| FR | 3096940 A1 | 12/2020 |
| JP | 2010241275 A | 10/2010 |
| JP | 5216671 B2 | 6/2013 |
| WO | 2019048538 A1 | 3/2019 |
| WO | 2020064590 A1 | 4/2020 |

* cited by examiner

LIGHTING DEVICE FOR A VEHICLE STEERING WHEEL AND VEHICLE STEERING WHEEL

TECHNICAL FIELD OF THE INVENTION

The present invention generally relates to a lighting device mounted in a steering wheel rim of a motor vehicle.

STATE OF THE ART

Lighting devices installed in a steering wheel rim are known in the prior art. Document WO2019048538A1 discloses such a lighting device. On the other hand, this system of the prior art may have the disadvantage of transmitting non-uniform light to the occupants of the vehicle.

Furthermore, document WO2020064590 discloses an optical system for interior lighting of a vehicle, comprising a light box 14 provided with light sources 32 integrated into orifices formed in a wall 14. The wall 14 serves as the light reflection surface of the light sources 32. On the other hand, this system of the prior art has the disadvantage of transmitting non-uniform light to the occupants of the vehicle.

DISCLOSURE OF THE INVENTION

One aim of the present invention is to address the disadvantages of the prior art mentioned above and in particular, first of all, to propose a lighting device for a steering wheel rim, which allows the transmission of uniform light to an occupant of the vehicle.

A first aspect of the invention therefore relates to a lighting device for a vehicle steering wheel, comprising:
at least two light sources,
a light diffuser comprising a collecting face and a diffusion face arranged so as to transmit light transmitted by the light sources to an occupant of the vehicle when the lighting device is integrated in the rim,
characterized in that the collecting face comprises at least two protrusions positioned with respect to the light sources such that the light transmitted by the diffusion face is uniform.

The relative arrangement of the protrusions and the light sources thus makes it possible to obtain a uniform light transmitted by the diffusion face.

According to one embodiment, the protrusions can be placed opposite the light sources. Preferably, the number of protrusions is at least equal to the number of light sources and each light source is placed opposite a protrusion. This embodiment makes it possible to obtain the transmission of uniform light in a simple and inexpensive way. This is because the protrusions can make it possible to locally vary the transmission coefficient of the diffuser, and can thus compensate for excessive intensity of the light arriving on the collecting face opposite the light sources.

According to one embodiment, the lighting device may further comprise a light guide located between the light sources and the collecting face, the light guide comprising an input surface provided with at least two distinct optical portions, the protrusions also being arranged relative to the optical portions so that the light transmitted by the diffusion face is uniform.

This embodiment makes it possible to produce a more complex lighting device, for example making it possible to house it in a narrow space, in particular a thinner one. For example, the light guide can be arranged to produce several internal reflections of the light transmitted by the light sources. Furthermore, a light guide can make it possible to ensure that the flux is routed from the sources to the collecting face by total internal reflection within the light guide, and to avoid light losses in the mechanical environment of the present lighting device.

Alternatively, the light sources between them and the light sources and the collecting face are separated by a free or empty space, without any wall or any element that can absorb or modify the light transmitted by the light sources. Such a free or empty space contributes to the light transmitted by the diffusion face being uniform and simplifies the construction of the lighting device.

According to one embodiment, the diffusion face may comprise high-luminance areas and low-luminance areas, the average luminance of the low-luminance areas representing at least 66% of the average luminance of the high-luminance areas, preferentially at least 74%. Such a parameter makes it possible to obtain uniform light. It should be noted that the human eye has a non-linear perception of luminance, according to a law that can be approximated by a logarithm. Such variations can allow uniform visual rendering of the diffusion face.

According to one embodiment, the lighting device may further comprise a support and the light sources are arranged regularly on said support, for example according to a first spacing. This makes it possible to simplify the design and manufacture of a lighting device according to the present invention, while allowing the transmission of uniform light by the diffusion face. The support is for example a printed circuit.

According to one embodiment, the protrusions can be arranged regularly on said collecting face, for example according to a second spacing equal to the first spacing or to a fraction of the first spacing. This makes it possible to further simplify the design and manufacture of a lighting device according to the present invention, while allowing the transmission of uniform light by the diffusion face. For example, the number of protrusions is equal to the number of light sources or is a multiple of the number of light sources.

According to one embodiment, the plurality of light sources can be fixed relative to the collecting face. For example, the support is fixed, or is fixed relative to the light diffuser.

According to one embodiment, the protrusions can each define a convexity of the collecting face. Such a protrusion shape is simple to manufacture and makes it possible to obtain uniform light in an optimal manner.

According to one embodiment, the collecting face can define a recess or concavity between each protrusion. The collecting face can then have the optimal shape of a regular undulation, for example a sinusoidal profile, which further contributes to obtaining a uniform light. Advantageously, there is only one recess or concavity between each protrusion.

According to one embodiment, the lighting device may further comprise a housing defining a groove and the light diffuser is arranged so that the diffusion face is arranged in or through the groove and the collecting face is arranged inside the housing. This can allow reliable and aesthetic mounting of the present lighting device in a steering wheel rim.

According to one embodiment, several light sources are arranged in the groove, for example two, five or more.

According to one embodiment, all of the protrusions are arranged inside the groove, preferably in their entirety. Thus, the device is more compact and there is less light loss.

According to one embodiment, the light sources comprise emitting surfaces arranged to emit light and the emitting surfaces are arranged in the groove. This ensures that all of the transmitted light will be transmitted to the light diffuser.

According to one embodiment, the lighting device may further comprise a screen located around the diffusion face. This can make it possible to improve the aesthetics of the present lighting device once integrated in a steering wheel rim.

The above embodiments can be combined, completely or partially.

A second aspect of the invention relates to a vehicle steering wheel comprising a lighting device according to the first aspect of the invention.

A third aspect of the invention relates to a motor vehicle comprising a lighting device according to the first aspect of the invention and/or a vehicle steering wheel according to the second aspect of the invention.

DESCRIPTION OF THE FIGURES

Other features and advantages of the present invention will become more apparent upon reading the following detailed description of an embodiment of the invention, which is provided by way of example but in no manner limited thereto, and illustrated by the attached drawings, wherein.

DETAILED DESCRIPTION OF EMBODIMENT(S)

The present invention relates to a lighting device for diffusing a uniform light. Preferably, such a lighting device is used in the field of transport, for example in a manner integrated into a control element of a vehicle, such as a handlebar, a steering wheel or a lever.

Figure 1:
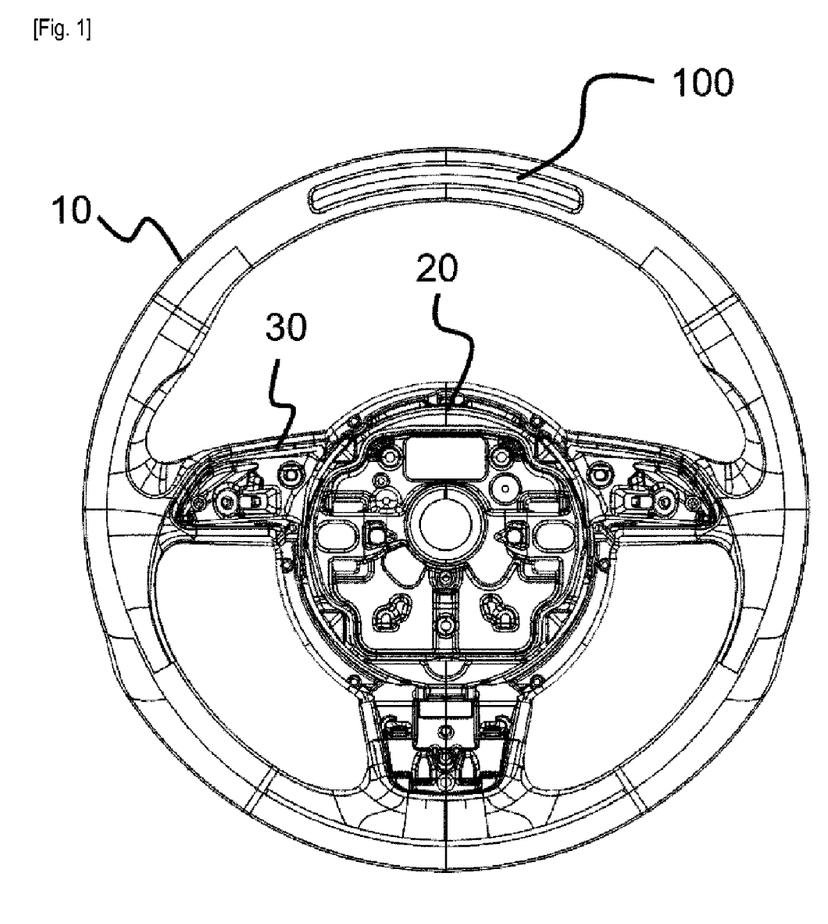
FIG. 1 shows a front view of a steering wheel comprising a lighting device in the rim.

FIG. 1 shows a view of a vehicle steering wheel that typically comprises a rim 10, connected to a hub 20 by a plurality of branches 30. The rim is equipped for example in the upper position, also known as the "12 o'clock" position, with a lighting device 100.

This lighting device 100 may have an external display wall that extends along the rim over an angular sector of about 30° to 40°, but a greater or lesser angular extent can be provided, for example up to 180° or even more.

Figure 2:
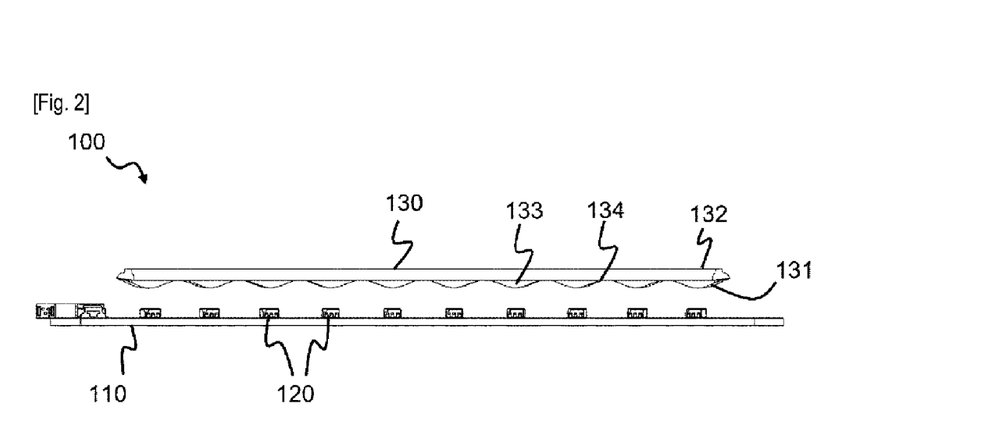
FIG. 2 shows a side view of a part of the lighting device in a plane.

FIG. 2 shows a side view of part of the lighting device 100. This lighting device can be linear as can be seen in FIG. 2 or may adopt any form imposed by the element of the vehicle in which it is integrated, such as the steering wheel of FIG. 1.

The lighting device 100 comprises a printed circuit board 110 or PCB receiving at least two light sources 120, and preferentially a plurality of light sources 120. These light sources are preferably light-emitting diodes or LEDs that can generate visible light, for example white light, as known to the person skilled in the art. The printed circuit board 110 may be parallel to the light diffuser 130, for example to the diffusion face 132.

These light sources 120 may each have the same power, that is to say generate the same brightness or the same light flux in the visible spectrum. They can be regularly arranged on the printed circuit board 110, that is, according to a first spacing. This first spacing can be chosen according to the power of the light sources, the desired luminance of the lighting device and the presence or absence of a light guide. For example, the first spacing is from 5 to 30 mm, preferably from 6 to 25 mm, even more preferably from 8 to 20 mm, more preferably from 10 to 15 mm, for example 13 or 14 mm. Furthermore, the light sources are preferably opposite each other, that is they are not placed in wells or separated by walls or other elements restricting the transmission of light between them.

In FIG. 2, a light diffuser 130 is located above the light sources 120, that is downstream in the light transmission direction. The light diffuser 130 comprises a light collecting face 131 arranged to receive the light transmitted by the light sources 120 and a diffusion face 132 arranged to transmit light transmitted by the light sources 120 to an occupant of the vehicle.

The light diffuser is made of a translucent material, such as a glass, a polyamide or a polycarbonate, and is preferentially uniform, that is to say that it has the same optical properties at every point of the material or at least in an intersecting plane between the collecting face 131 and the diffusion face 132. It is preferably made of a single part and/or solid, that is without a vacuum, hollow or internal cavity and is provided to be passed through by the light of the light sources. This makes it possible to improve the homogeneity and/or continuity of the light along the diffusion face.

Preferably, the collecting face 131 also has the same optical properties at every point, in particular a uniform or constant refractive index. The diffusion face 132 may also have uniform optical properties. For example, the translucent material of the diffuser has a haze value measured according to ISO 13468 greater than 90% for 2.0 mm thick.

The collecting face 131 comprises at least two protrusions 133 and preferably a plurality of protrusions 133. The protrusions 133 can have any suitable shape, optionally truncated, for example a pyramidal shape, a conical shape, a tooth shape, a dune shape, a wave shape or even a "Toblerone" shape. The protrusions 133 can be arranged so that the thickness of material of the light diffuser 130, to pass through the light of the light sources 120, is proportional to the quantity of light received at each point of the collecting face 131.

In the diagram of FIG. 2, the protrusions have a wave shape, that is, have a convex shape and are each separated by a recess 134 as a concavity. The height of each protrusion 133 relative to the recess 134 can be constant. For example, for a milky appearance material with a transmission of 50% to 2.0 mm thickness, this height may be 0.5 mm to 5.0 mm, preferably 1.0 to 3.0 mm, even more preferably 1.5 to 2.5 mm and for example 2.0 mm. For a dark-appearance diffuser, with a transmission between 5% and 20% for 2.0 mm thick, preferentially between 8% and 15%, the height of the protrusions may be from 0.1 to 1.0 mm, preferably from 0.2 to 0.5 mm.

The protrusions 133 are generally arranged relative to the light sources such that the light transmitted by the diffusion face is uniform. For example, the diffusion face comprises high-luminance areas and low-luminance areas, the average luminance of the low-luminance areas representing at least 66% of the average luminance of the high-luminance areas, preferentially at least 74%, even more preferentially 82%.

The luminance may be defined as a power of a visible light passing through or being transmitted into a surface element in a given direction, per unit of area and per unit of solid angle. It may thus be the light power passing through the diffusion face 132, per unit of area of this face and at a given angle, for example 90°, that is normal to said surface.

These high-luminance and low-luminance areas can be determined by simulation, or by a direct measurement with a luminance measurement device, that is a luminance meter or a spotmeter as known to a person skilled in the art.

The protrusions 133 can be regularly arranged on the collecting face 131, that is, according to a second spacing. This second spacing may be equal to the first spacing, as shown in FIG. 2, or else be a fraction of the first spacing, for example ½, ⅓, ¼ or even ⅕, in particular in the case where a light guide is positioned between the light sources 120 and the protrusions 133 and this light guide leads to a different distribution of the light impacting the collecting face 131.

The collecting face 131 can be on average parallel to the printed circuit board 110, i.e. without consideration for the protrusions 133. In other words, the free length between a light source and a protrusion facing same can be constant. This free length can be chosen according to the size or diameter of the rim, as well as the nature of the light sources. This free length may be 1.0 to 10.0 mm, preferably 2.0 to 8.0 mm, even more preferably 3.0 to 7.0 mm and most preferably 4.0 to 7.0 mm, for example 4.0, 4.5 or 5.0 mm.

In the embodiment of FIG. 2, the protrusions 133 are placed opposite or facing the light sources 120. In the case where the number of protrusions 133 is greater than the number of light sources 120, at least part of the protrusions can be placed opposite or facing the light sources 120. For example, a light source 120 and a protrusion 133 can be aligned on a radius of the rim 10 of the steering wheel.

Thus, the protrusions 133 can define a maximum thickness in line with the light sources 120 and the hollows 134 can define a minimum thickness opposite the gap between two light sources 120, that is to say in an area that receives the least light. The thickness between the protrusions 133 can also be adjusted based on the intensity of the light transmitted by the light sources 120. In the embodiment shown, all the protrusions 133 are identical, since all the light sources 120 are identical. Different protrusions 133 can be arranged opposite light sources having different light intensities, the shape and/or height of each protrusion can then be adapted to the light transmitted by each light source 120.

More generally, the light sources 120 can generate high-brightness areas and low-brightness areas wherein the light flux is less than in high-brightness areas. Thus, the light sources can generate on the collecting face 131 high-luminance areas and low-luminance areas. For example, the high-luminance areas have a luminance at least 10% greater than the average luminance of the collecting face 131.

The protrusions 133 can be arranged in these high brightness areas, that is to say occupy the high-luminance areas of the collecting face 131. The spaces between the protrusions like the hollows 134 or concavities can then be arranged in the zones with low brightness, that is to say occupy the low-luminance zones of the collecting face 131.

Alternatively or in combination, a luminance can be measured in a measurement plane, like a median plane between the light sources 120 and the collecting face 131, for example in the absence of the light diffuser 130. Preferably, the measurement plane is perpendicular to an axis of rotation of the steering wheel and the luminance meter can be positioned so as to avoid or limit the perspective defects. The focus of the luminance meter can be done on the measurement plane.

Figure 3:
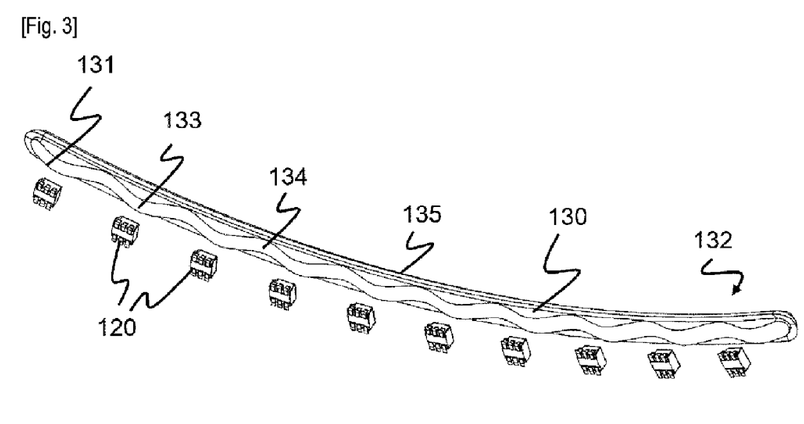
FIG. 3 shows a partial bottom view of the lighting device.

FIG. 3 corresponds to a partial bottom view of the lighting device 100. This view illustrates its curved shape arranged to integrate into the vehicle steering wheel of FIG. 1. Only the light sources 120 and the light collector 130 are shown in FIG. 3, so as to show the sinusoidal profile of the collecting face 131. A peripheral lateral portion 135 is positioned halfway up the light collector 130, so as to allow its positioning and assembly within the lighting device 100, in particular in the screen 160 shown in the following Figures.

Figure 4:
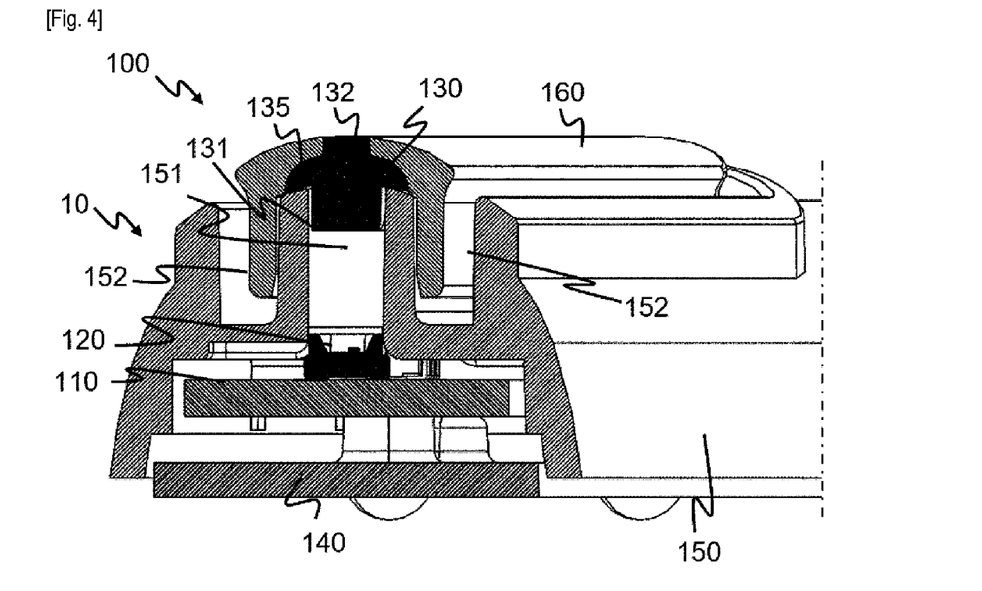
FIG. 4 shows a cross-section of the rim at the lighting device with a light source arranged to diffuse light toward an occupant of the vehicle through an elongated or groove opening of the lighting device.

FIG. 4 corresponds to a sectional view of the rim 10 of the steering wheel of FIG. 1, provided with the lighting device 100 of FIG. 3. The printed circuit board 110 provided with the light sources 120 is arranged according to FIG. 4 between a cover 140 and a housing 150 defining a groove 151. In an alternative embodiment, the printed circuit board 110 can act as a cover, which saves a room.

The diffusion face 132 of the light diffuser 130 may have a dimension smaller than the collecting face 131, for example a width, as can be seen in FIG. 4 and/or an area. For example, the width of the diffusion face 132 represents at most 85%, for example at most 75% of the width of the collecting face 131. Furthermore, the width of the diffusion face 132 may represent at least 30%, preferably at least 50% and even more preferably at least 60% of the width of the collecting face 131. Such a lower width contributes to obtaining the transmission of uniform light with high luminance by the diffusion face 132 owing to a better concentration of the light.

The largest dimension of the light diffuser 130 can thus represent the length of the light diffuser 130, of the collecting face 131 and/or of the diffusion face 132, the dimension perpendicular to this dimension may represent the width and the distance between the collecting face 131, and the diffusion face 132 may represent the height or the depth of the light diffuser 130.

The light diffuser 130 is placed in the groove 151, the collecting face 131 being oriented toward an interior of the housing 150 and the diffusion face 132 being oriented toward an exterior of the housing 150, that is to say toward an interior of the vehicle when the steering wheel is mounted in a vehicle. The groove 151 preferably has a free space between the collecting face 131 and the light sources 120, without a wall or element that can restrict the diffusion of the light other than the walls of the groove 151. Thus, the groove (or channel) 151, in particular the totality of the walls of the groove (or channel) 151 may participate in the guiding of the light. Advantageously, the walls of the groove 151 have a reflective surface, typically with an optical grade such as a white material having a reflection coefficient greater than 80%, for example a plastic material of the Polyamide (PA), Polycarbonate (PC), Polypropylene (PP) type.

An optional screen 160 may also be arranged in or on the groove 151, for example on either side of the light diffuser 130. For example, the screen can be placed between the groove 151 and two parallel grooves 152 of the housing 150 and/or partially housed in the parallel grooves 152. These two parallel grooves 152 may join together beyond an end of the groove 151, as can be seen in FIG. 3. The screen 160 can have a central groove allowing the diffusion face 132 to be visible directly from the outside. For example, the diffusion face 132 may be flush with the screen 160 or may protrude.

The light diffuser 130 can be blocked between an end portion of the housing 150 defining the groove 151 and the screen 160, so as to simplify assembly. For example, the screen 160 is glued into the parallel grooves 152 and/or blocked by a hide or leather of the steering wheel housed partially in these parallel grooves 152.

The light diffuser 130 may further have the peripheral lateral portion 135 visible in FIG. 3 or independent lateral portions, which extend along the width of the light diffuser, for example at mid-height of the light diffuser 130. This lateral portion 135 may have an interior face, that is, oriented toward the light sources 120, making it possible to abut the housing 150, for example on the walls of the groove 151.

Furthermore, the lateral portion 135 may have an upper face, i.e. one oriented in a direction opposite to the light sources 120, making it possible to position or overmold the screen 160. In other words, this lateral portion can be wider than the diffusion face 132, the lateral portion being, once assembled, preferentially masked by the screen 160. The lateral portion 135 of the light diffuser 130 therefore allows easy positioning and assembly of the light diffuser 130 within the lighting device 100. In particular, if the screen 160 is overmolded, this lateral portion 135 not essential to the diffusion of the light can be used as a contact surface in an overmolding mold without contact marks generate light diffusion defects.

In operation, the light transmitted by the light sources is transmitted onto the collecting face 131. A first part of the light passes through the light diffuser 130 at the protrusions 133, and then has a certain distance left to travel within the light diffuser 130. A second part of the light passes through the light diffuser at the recesses 134 and then has less distance to travel through the light diffuser 130, due to the absence of protrusions.

The first part of the light will be more absorbed than the second part of the light, which can compensate for the high-luminance and low-luminance areas generated on the collecting face 131 so that the light transmitted by the diffusion face 132 is uniform.

Figure 5:
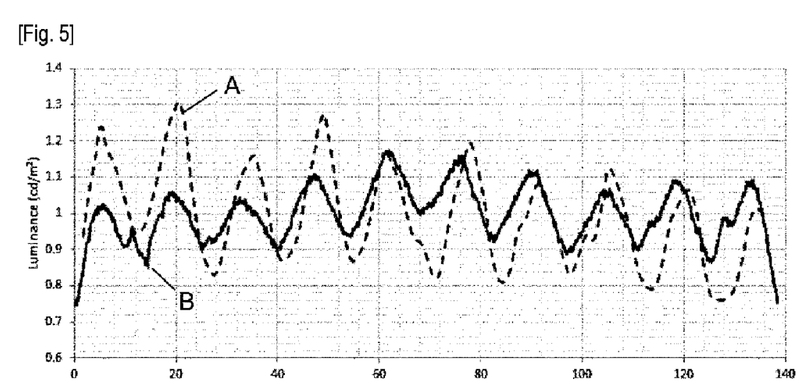
FIG. 5 shows variations in luminance of a diffusion face of a lighting device not comprising protrusion (curve A) and a lighting device according to one embodiment of the present invention, that is comprising protrusions on the collecting face of the light guide (curve B).

FIG. 5 shows the luminances obtained on the diffusion faces of two lighting devices similar to that of FIG. 2 or FIG. 3, each comprising ten light sources arranged regularly. Curve A represents the variation in luminance obtained with a light diffuser without any protrusions, that is to say with a flat collecting face. Curve B represents the variation in luminance obtained with a light diffuser according to an embodiment of the present invention, that is, provided with protrusions positioned opposite the light sources.

For the two lighting devices, the corresponding light diffuser was made of bulk-tinted polycarbonate to obtain a dark appearance and the light sources were light-emitting diodes of the LRTB GVSG type operating at an intensity of mA. Their light intensity is from 500 to 1000 mcd in the red spectrum, from 1250 to 2010 mcd in the true green spectrum and from 180 to 560 mcd in the blue spectrum. The spacing between two light sources is 13.3 mm, the free length between a light source and a protrusion facing it is 4.5 mm and the height of the protrusions relative to the hollows of the light diffuser is 1.8 mm.

It is apparent from FIG. 5 that the variation in luminance obtained according to the present invention (Curve B) is more limited than the variation in luminance obtained for the comparison lighting device, without the protrusions (Curve A). Thus, the lighting device according to the present invention makes it possible to obtain an average luminance of the low-luminance zones (valleys of curve B) representing at least 74% of the average luminance of the high-luminance zones (peaks of curve B). The lighting device according to this embodiment allows the transmission of a uniform light to an occupant of the vehicle.

In an embodiment not shown, a light guide can be placed between the collecting face 131 and the light sources 120. This light guide can be housed in the free length between the protrusions 133 and the light sources 120. It may take any suitable form and for example comprise an inlet surface provided with distinct optical portions, arranged for example opposite or in contact with the light sources 120.

In this case, the protrusions 133 can also be arranged relative to the distinct optical portions. The discrete optical portions can be regularly arranged, for example according to a third spacing equal to the first spacing of the light sources. The optical portions may further comprise dispersive patterns such as grooves and/or primers. The light guide may have an output surface common to all the optical portions, for example parallel or at least opposite the collecting face of the light diffuser.

More generally, the light guide can contribute to creating additional high brightness areas between the output surface and the collecting face 131, that is other high-luminance areas on the collecting face 131. Additional protrusions can then be arranged in these additional high-luminance areas. Alternatively or in combination, the light diffuser can modify the high-luminance areas on the collecting face 131 and the positions of the protrusions 133 can then be modified accordingly.

The light guide may comprise several deflecting surfaces, making it possible to produce several reflections of the light inside the light guide, so as to generate a change in the main direction of the light between an input surface of the light guide and the collecting face of the light diffuser.

In this way, the light sources may not be placed in a plane parallel to the diffusion face, which may contribute to creating a more compact lighting device. In addition, the light guide may be arranged to generate other optical effects such as a concentration or diffusion of the light.

It will be understood that various modifications and/or improvements which are obvious to a person skilled in the art may be made to the different embodiments of the invention described in the present description without departing from the scope of the invention.

For example, the housing 150 and the screen 160 can take any suitable shape. Furthermore, a display can be arranged above the diffusion face 132 and the light from the light sources is then transmitted through this display. The diffusion face 132 may also take any suitable shape and may for example be flat, crenelated or even semi-circular.

The invention claimed is:

1. A lighting device for a vehicle steering wheel rim, comprising:
   at least two light sources,
   a unitary light diffuser comprising a collecting face and a diffusion face with continuous, translucent material extending between the collecting face and the diffusion face, wherein the light diffuser is arranged so as to transmit light transmitted by the light sources to an occupant of the vehicle when the lighting device is integrated in the rim,
   characterized in that the collecting face comprises at least two protrusions positioned with respect to the light sources such that the light transmitted by the diffusion face is uniform, wherein the light diffuser is positioned adjacent to the light sources so as to receive light from the light sources directly, and wherein the diffusion face of the light diffuser is directly visible by the occupant of the vehicle, and wherein the at least two protrusions are placed opposite the light sources.

2. The lighting device according to claim 1, wherein the diffusion face comprises high-luminance zones and low-luminance zones, the average luminance of the low-luminance zones representing at least 66% of the mean luminance of the high-luminance zones, preferentially at least 74%.

3. The lighting device according to claim 1, further comprising a support and wherein the light sources are arranged regularly on said support according to a first spacing.

4. The lighting device according to claim 3, wherein the protrusions are arranged regularly on said collecting face, according to a second spacing equal to the first spacing or to a fraction of the first spacing.

5. The lighting device according to claim 1, wherein the protrusions each define a convexity of the collecting face.

6. The lighting device according to claim 1, wherein the collecting face defines a recess or a concavity between each protrusion.

7. The lighting device according to claim 1, further comprising a housing defining a groove and wherein the light diffuser is arranged so that the diffusion face is arranged in or through the groove and the collecting face is arranged inside the housing.

8. The lighting device according to claim 1, further comprising a screen located around the diffusion face.

9. The lighting device according to claim 1 in combination with a vehicle steering wheel.

10. The lighting device according to claim 1 in combination with a motor vehicle.

11. The lighting device according to claim 1, wherein each of the at least two protrusions is positioned within a groove defined by a housing.

12. The lighting device according to claim 11, wherein each of the at least two light sources is positioned within the groove.

13. The lighting device according to claim 1, wherein the collecting face defines a regular undulation comprising a smoothly curved shape.

14. The lighting device according to claim 1, wherein each of the at least two protrusions is spaced apart from an adjacent light source of the at least two light sources by a distance, wherein each of the at least two protrusions defines a height relative to an adjacent recess, and wherein the distance is greater than the height.

15. A vehicle steering wheel rim, comprising:
a housing defining a groove;
a plurality of light sources; and
a light diffuser comprising a collecting face and a diffusion face, wherein the light diffuser is arranged so as to transmit light transmitted by each of the plurality of light sources to an occupant of the vehicle when the lighting device is integrated in the rim,
wherein the light diffuser is positioned within the groove,
wherein each of the plurality of light sources is positioned within the groove and spaced apart from the light diffuser,
wherein the collecting face comprises a plurality of protrusions positioned with respect to the plurality of light sources such that the light transmitted by the diffusion face is uniform,
wherein each of the plurality of protrusions of the collecting face protrudes towards and is configured to receive light directly from the plurality of light sources, and
wherein the light diffuser is positioned adjacent to but spaced apart from the light sources within the groove so as to receive light directly from the plurality of light sources within the groove.

16. The vehicle steering wheel rim of claim 15, wherein the light diffuser comprises continuous, translucent material extending between the collecting face and the diffusion face.

* * * * *